US012811060B2

(12) United States Patent
Lee et al.

(10) Patent No.: US 12,811,060 B2
(45) Date of Patent: Nov. 24, 2026

(54) CAPACITOR AND METHOD FOR MANUFACTURING THE SAME

(71) Applicant: SAMSUNG ELECTRO-MECHANICS CO., LTD., Suwon-si (KR)

(72) Inventors: Kwangmook Lee, Suwon-si (KR); Jungsub Choi, Suwon-si (KR); Jun-Goo Won, Suwon-si (KR); Hyungoo Jeon, Suwon-si (KR); Jihoon Park, Suwon-si (KR); Gwangpyo Park, Suwon-si (KR); A Young Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 236 days.

(21) Appl. No.: 18/628,084

(22) Filed: Apr. 5, 2024

(65) Prior Publication Data

US 2025/0062071 A1 Feb. 20, 2025

(30) Foreign Application Priority Data

Aug. 18, 2023 (KR) ........................ 10-2023-0108463

(51) Int. Cl.
*H01G 4/012* (2006.01)
*H01G 4/12* (2006.01)
(Continued)

(52) U.S. Cl.
CPC ........... *H01G 4/012* (2013.01); *H01G 4/1236* (2013.01); *H01G 4/232* (2013.01); *H01G 4/30* (2013.01)

(58) Field of Classification Search
CPC ...... H01G 4/012; H01G 4/1236; H01G 4/232; H01G 4/30
See application file for complete search history.

(56) References Cited

U.S. PATENT DOCUMENTS

2008/0068780 A1* 3/2008 Shioga .................. H01G 4/008 29/25.03
2017/0194418 A1* 7/2017 Papavasiliou .......... H10D 1/692
(Continued)

FOREIGN PATENT DOCUMENTS

EP 4009340 A1 6/2022
JP 2020-038891 A 3/2020
(Continued)

OTHER PUBLICATIONS

Notice of Allowance dated Sep. 11, 2024, issued in corresponding Korean Patent Application No. 10-2023-0108463 with an English Machine translation.
(Continued)

*Primary Examiner* — Michael P Mcfadden
(74) *Attorney, Agent, or Firm* — Morgan, Lewis & Bockius LLP

(57) ABSTRACT

A capacitor may include a structure body including a first surface and a second surface positioned in opposite directions, where a plurality of openings are positioned on the first surface, a first internal electrode disposed on a region where the plurality of openings are positioned, a dielectric layer disposed on a partial region of the first internal electrode, a second internal electrode disposed on the dielectric layer, a first external electrode disposed on the first surface, and connected to the first internal electrode, and a second external electrode disposed on the first surface, and connected to the second internal electrode.

14 Claims, 16 Drawing Sheets

(51) Int. Cl.

| | |
|---|---|
| ***H01G 4/232*** | (2006.01) |
| ***H01G 4/30*** | (2006.01) |

(56) References Cited

U.S. PATENT DOCUMENTS

| | | | | |
|---|---|---|---|---|
| 2019/0096587 | A1 | 3/2019 | Shin et al. | |
| 2019/0103227 | A1 | 4/2019 | Lu et al. | |
| 2019/0122820 | A1* | 4/2019 | Harada | H01G 4/228 |
| 2021/0020738 | A1* | 1/2021 | Kagawa | H10D 1/712 |
| 2021/0074477 | A1* | 3/2021 | Oukassi | H01G 11/70 |
| 2023/0307185 | A1 | 9/2023 | Voiron et al. | |

FOREIGN PATENT DOCUMENTS

| | | |
|---|---|---|
| KR | 10-2007-0019432 A | 2/2007 |
| KR | 10-2019-0037045 A | 4/2019 |

OTHER PUBLICATIONS

Extended European Search Report dated Jan. 27, 2025 issued in European Patent Application No. 24164558.9.

Woo Lee et al., "Porous Anodic Aluminum Oxide: Anodization and Templated Synthesis of Functional Nanostructures," Chemical Reviews, vol. 114, Jun. 13, 2014, pp. 7487-7556.

Korean Office Action dated Jul. 9, 2024 issued in Korean Patent Application No. 10-2023-0108463 (with English translation).

* cited by examiner

CAPACITOR AND METHOD FOR MANUFACTURING THE SAME

CROSS-REFERENCE TO RELATED APPLICATION

This application claims priority to and the benefit of Korean Patent Application No. 10-2023-0108463 filed in the Korean Intellectual Property Office on Aug. 18, 2023, the entire contents of which is incorporated herein by reference.

TECHNICAL FIELD

The present disclosure relates to a capacitor and a method for manufacturing the same.

BACKGROUND

Electronic components used in electronic devices include capacitors, inductors, piezoelectric elements, varistors, or thermistors. A multilayer capacitor among such ceramic electronic devices may be used in various electronic devices due to the merit of small size, high capacity, and easy mounting.

For example, a multilayer capacitor may be used in a condenser in the form of a chip that is mounted on a substrate of various electronic products such as an image device such as a liquid crystal display device (LCD), a plasma display device panel (PDP), an organic light emitting diode (OLED), or the like, a computer, a personal portable terminal, and a smart phone, and serves to charge or discharge electricity.

With the recent trend toward miniaturization and thinning of electronic products, demand for capacitors with higher capacity than existing multilayer capacitors is increasing.

SUMMARY

The present disclosure attempts to provide a capacitor having a high capacity and a method for manufacturing the same.

However, the objective of the present disclosure is not limited to the aforementioned one, and may be extended in various ways within the spirit and scope of the present disclosure.

A capacitor may include a structure body including a first surface and a second surface positioned in opposite directions, where a plurality of openings are positioned on the first surface, a first internal electrode disposed on a region where the plurality of openings are positioned, a dielectric layer disposed on a partial region of the first internal electrode, a second internal electrode disposed on the dielectric layer, a first external electrode disposed on the first surface, and connected to the first internal electrode, and a second external electrode disposed on the first surface, and connected to the second internal electrode.

The structure body may include anodizing aluminum oxide.

The plurality of openings may include a first opening and a second opening, and the first external electrode may face a region where the first opening is positioned in a direction in which the first surface and the second surface are spaced apart.

The plurality of openings may include a first opening and a second opening, and the first external electrode may be connected to the first internal electrode of a region positioned adjacent to the first opening.

The first external electrode may be connected to the first internal electrode by directly contacting.

The first external electrode may include a first sub-electrode portion contacting the first internal electrode, and a first main electrode portion positioned on the first sub-electrode portion.

The plurality of openings may include a first opening and a second opening, and the second external electrode may face a region where the second opening is positioned, in a direction in which the first surface and the second surface are spaced apart.

The plurality of openings may include a first opening and a second opening, and the second external electrode may be connected to the second internal electrode of a region positioned adjacent to the second opening.

The second external electrode may be connected to the second internal electrode by directly contacting.

The second external electrode may include a second sub-electrode portion contacting the second internal electrode, and a second main electrode portion positioned on the second sub-electrode portion.

The first external electrode and the second external electrode may be provided in a plural quantity, respectively.

The dielectric layer may include one of $Al_2O_3$, $ZrO_2$, and $HfO_2$ or a combination thereof, or ZAZ which is a $ZrO_2$—$Al_2O_3$—$ZrO_2$ composite layer.

The first external electrode may cover one or more of the plurality of openings in which the second internal electrode is not disposed, and the second external electrode may cover one or more of the plurality of openings in which the second internal electrode is disposed.

A capacitor may include a structure body of anodizing aluminum oxide, including first surface and a second surface positioned in opposite directions, where a plurality of openings are positioned on the first surface, a first internal electrode disposed on the first surface in a region between the plurality of openings, and on the plurality of openings, a dielectric layer disposed on a partial region of the first internal electrode, a second internal electrode disposed on the dielectric layer, a first external electrode connected to the first internal electrode, and disposed in a direction to which the first surface of the structure body faces, and a second external electrode connected to the second internal electrode, and disposed in the direction to which the first surface of the structure body faces.

The opening may include first openings and a second opening, the dielectric layer and the second internal electrode may not exist in a region where the first openings are adjacent to each other, and the first external electrode may be connected to the first internal electrode of a region positioned adjacent to the first openings.

A filling portion may be disposed on the first internal electrode disposed in a first opening of the plurality of openings.

A method for manufacturing a capacitor may include forming a plurality of openings in a substrate, forming a first internal electrode on a region where the plurality of openings are positioned, forming a dielectric layer in a region where a second opening among the openings is positioned, excluding a region where a first opening among the openings is positioned, and forming a second internal electrode on the dielectric layer.

The method for manufacturing a capacitor may further include forming an insulation material layer on the first internal electrode of a region where the first opening is positioned, and the second internal electrode of a region where the second opening is positioned, and forming an open hole in at least a portion among the region where the first opening is positioned and the region where the second opening is positioned.

A seed layer may be formed on the open hole.

An external electrode layer may be formed on the seed layer.

According to at least one of embodiments, a capacitor having a high capacity and a method for manufacturing the same may be provided.

DETAILED DESCRIPTION OF THE EMBODIMENTS

Figure 1:
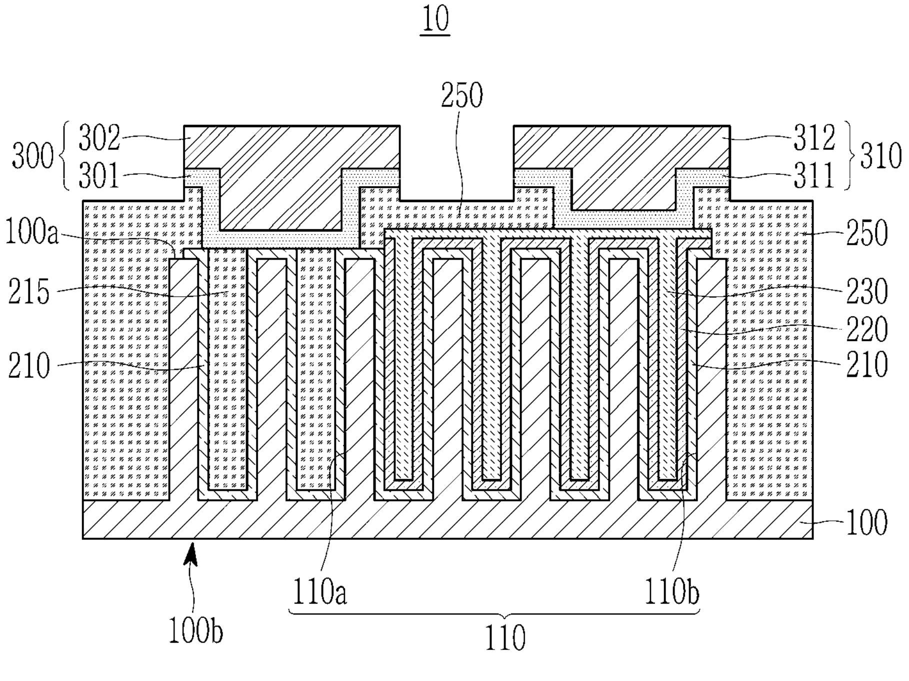
FIG. 1 is a drawing showing a capacitor according to an embodiment.

The present disclosure will be described more fully hereinafter with reference to the accompanying drawings, in which embodiments of the disclosure are shown. In order to clearly describe the present disclosure, parts or portions that are irrelevant to the description are omitted, and identical or similar constituent elements throughout the specification are denoted by the same reference numerals. In addition, some constituent elements are exaggerated, omitted, or briefly illustrated in the added drawings, and sizes of the respective constituent elements do not reflect the actual sizes.

Further, the accompanying drawings are provided for helping to easily understand exemplary embodiments disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

Terms including ordinal numbers such as first, second, and the like will be used only to describe various components, and are not interpreted as limiting these components. The terms are only used to differentiate one component from others.

It will be understood that when an element such as a layer, film, region, area, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof. In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

In addition, throughout the specification, "connected" means that two or more components are not only directly connected, but two or more components may be connected indirectly through other components, physically connected as well as being electrically connected, or it may be referred to by different names depending on the location or function, but may mean integral.

Throughout the specification, a substrate S may have a structure that is wide in a plan view and thin in a cross-sectional view, 'the planar direction of the substrate S' may indicate a direction parallel to the wide and flat surface of the substrate S, and the 'thickness direction of the substrate S' may indicate a direction that is perpendicular to a wide and flat surface of the substrate S.

FIG. 1 is a drawing showing a capacitor according to an embodiment.

Referring to FIG. 1, a capacitor 10 according to an embodiment includes a structure body 100, a first internal electrode 210, a dielectric layer 220, a second internal electrode 230, a first external electrode 300 and a second external electrode 310.

The structure body 100 includes a first surface 100*a* and a second surface 100*b* positioned in opposite directions. FIG. 1 illustrates that the first surface 100*a* is disposed above, and the second surface 100*b* is disposed below. Accordingly, the first surface 100*a* may be referred to as an upper surface, and the second surface 100*b* may be referred to as a lower surface. In addition, a direction in which the first surface 100*a* and the second surface 100*b* face each other may be referred to as a vertical direction. The structure body 100 is provided as an insulation material. A plurality of openings 110 are positioned on the first surface 100*a* of the structure body 100. The opening 110 may be a column-shaped space extending from the first surface 100*a* toward the second surface 100*b*. As an example, the structure body 100 may be made of porous anodizing aluminum oxide (AAO), and the opening 110 may be formed by micropores formed in the anodizing aluminum oxide. The aspect ratio of the micropores may be 2000 to 3000. Additionally, the structure body 100 may have a structure in which the lower portion of the micropore is blocked.

The first internal electrode 210 is disposed on the opening 110. In addition, the first internal electrode 210 is disposed in a section between adjacent openings 110 on the first surface 100*a* of the structure body 100. Accordingly, in the first internal electrode 210, regions positioned on the openings 110 may be connected to each other by regions positioned on the first surface 100*a* of the structure body 100.

The opening 110 includes a first opening 110*a* and a second opening 110*b*. At least one of the plurality of openings 110 is provided as the first opening 110*a*, and remaining openings 110 are provided as the second opening 110*b*.

A filling portion 215 may be disposed on the first internal electrode 210 disposed in the first opening 110*a*. The filling portion 215 may be made of an insulation material. The filling portion 215 may be formed to fill the space remaining after the first internal electrode 210 is filled in the first opening 110*a*.

The dielectric layer 220 is disposed on a partial region of the first internal electrode 210. The dielectric layer 220 is disposed on the first internal electrode 210 of the second opening 110*b*. In addition, the dielectric layer 220 is disposed on the first internal electrode 210 between adjacent second openings 110*b*. The dielectric layer 220 is not formed on the first opening 110*a*, and is not formed on the first internal electrode 210 disposed in a region between adjacent first openings 110*a* on the first surface 100*a*.

The second internal electrode 230 is disposed on the dielectric layer 220. That is, the second internal electrode 230 is disposed on the dielectric layer 220 of the second opening 110*b*. In addition, the second internal electrode 230 is disposed on the dielectric layer 220 between the adjacent second openings 110*b*. Accordingly, the second internal electrode 230 faces the first internal electrode 210 interposing the dielectric layer 220, in the second openings 110*b* and regions between the adjacent second openings 110*b*. The second internal electrode 230 may be formed to fill an inner space of the second opening 110*b*. The second internal electrode 230 is not formed in the first opening 110*a* and a region between the adjacent first openings 110*a* in the first surface 100*a*.

The first external electrode 300 is connected to the first internal electrode 210. The first external electrode 300 is disposed on the first surface 100*a* direction of the structure body 100. The first external electrode 300 may face a region where the first opening 110*a* is positioned in the vertical direction.

The first external electrode 300 is connected to the first internal electrode 210 of a region positioned adjacent to the first opening 110*a*. Specifically, in the region positioned adjacent to the first opening 110*a*, the dielectric layer 220 does not exist on the first internal electrode 210. Accordingly, the first external electrode 300 is provided to directly contact the first internal electrode 210 of the region positioned adjacent to the first opening 110*a*, and may be connected to the first internal electrode 210.

The first external electrode 300 may include a first sub-electrode portion 301 and a first main electrode portion 302.

The first sub-electrode portion 301 is connected to the first internal electrode 210. At least a portion of the first sub-electrode portion 301 may be positioned on the first internal electrode 210 of the region positioned adjacent to the first opening 110*a*. At least a portion of the first sub-electrode portion 301 may directly contact the first internal electrode 210 of the region positioned adjacent to the first opening 110*a*.

The first main electrode portion 302 is connected to the first sub-electrode portion 301. At least a portion of the first main electrode portion 302 may be positioned on the first sub-electrode portion 301. At least a portion of the first main electrode portion 302 may directly contact the first sub-electrode portion 301. For example, the first main electrode portion 302 may directly contact the first sub-electrode portion 301, in a direction facing the structure body 100.

The second external electrode 310 is connected to the second internal electrode 230. The second external electrode 310 is disposed on the first surface 100*a* direction of the structure body 100. The second external electrode 310 may face at least a portion of a region where the second opening 110*b* is positioned in the vertical direction.

The second external electrode 310 may be provided to contact at least a portion of the second internal electrode 230 of a region positioned adjacent to the second opening 110*b*, and may be connected to the second internal electrode 230.

The second external electrode 310 may include a second sub-electrode portion 311 and a second main electrode portion 312.

The second sub-electrode portion 311 is connected to the second internal electrode 230. At least a portion of the second sub-electrode portion 311 may be positioned on at least a portion of the second internal electrode 230 of the region positioned adjacent to the second opening 110*b*. At least a portion of the second sub-electrode portion 311 may directly contact at least a portion of the second internal electrode 230 of the region positioned adjacent to the second opening 110*b*. The second sub-electrode portion 311 may be provided as the same material as the first sub-electrode portion 301.

The second main electrode portion 312 is connected to the second sub-electrode portion 311. At least a portion of the second main electrode portion 312 may be positioned on the second sub-electrode portion 311. At least a portion of the second main electrode portion 312 may directly contact the second sub-electrode portion 311. For example, the second main electrode portion 312 may directly contact the second sub-electrode portion 311, in a direction facing the structure body 100. The second main electrode portion 312 may be provided as the same material as the first main electrode portion 302.

In the first internal electrode 210 disposed adjacent to the first opening 110*a*, an insulating portion 250 may be positioned on a region other than a region contacting the first external electrode 300. The insulating portion 250 may be positioned to fill a region where a portion in the first external electrode 300 disposed apart from the first internal electrode 210 and the first internal electrode 210 face each other. In addition, the insulating portion 250 may be positioned to fill a region where a portion in the first external electrode 300 disposed apart from the first internal electrode 210 and the second external electrode 310 face each other.

In addition, in the second internal electrode 230 disposed adjacent to the second opening 110*b*, the insulating portion 250 may be positioned on a region other than a region contacting the second external electrode 310. The insulating portion 250 may be positioned to fill a region where a portion in the second external electrode 310 disposed apart from the second internal electrode 230 and the second internal electrode 230 face each other.

In addition, the insulating portion 250 may be positioned to fill a step positioned outside a region where the opening 110 is formed in the structure body 100. In the structure body 100, the insulating portion 250 may be positioned to surround at least a portion of outer periphery of the region where the opening 110 is formed.

The insulating portion 250 may be the same material as the filling portion 215.

FIG. 2 to FIG. 14 are drawings showing a manufacturing method of a capacitor according to an embodiment.

Hereinafter, a manufacturing method of the capacitor 10 according to an embodiment will be described with reference to FIG. 2 to FIG. 14.

Figure 2:
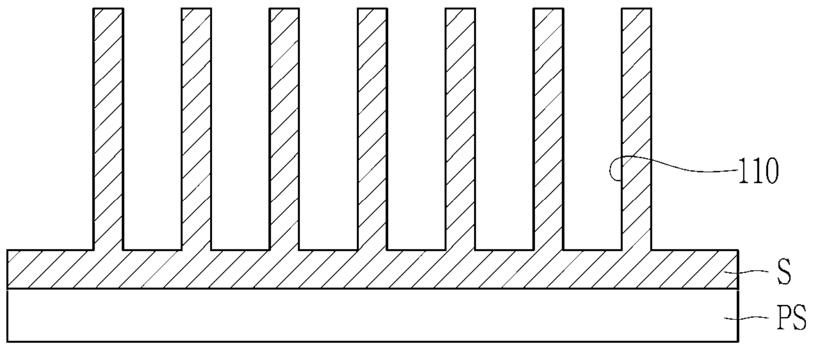
FIG. 2 to FIG. 14 are drawings showing a manufacturing method of a capacitor according to an embodiment.

Referring to FIG. 2, the substrate S forming the structure body 100 is provided. The substrate S is provided with the plurality of openings 110 formed therein. The substrate S may be made of anodic aluminum oxide (AAO), and the openings 110 may be micropores formed by an anodic oxidation method. At this time, the lower end portion of the opening 110 is provided in a blocked state. The substrate S may be in a state where a region where the opening 110 is positioned is divided into a size corresponding to the size of the capacitor 10 through etching using a mask. The mask may be made by using photoresist PR or the like. Accordingly, in the substrate S, a step may be formed outside the region where the opening 110 is positioned. Additionally, the substrate S may be provided while being positioned on the process substrate PS. The process substrate PS improves the operability of the substrate S during the manufacturing process of the capacitor 10 and prevents damage to the substrate S. The process substrate PS may be a silicon wafer.

Figure 3:
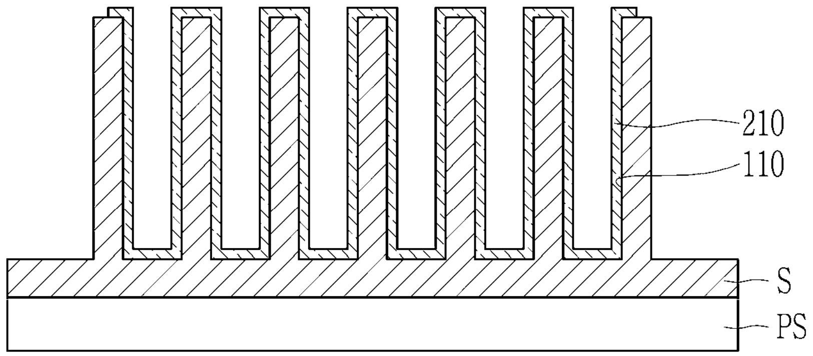

Referring to FIG. 3, in the structure body 100, the first internal electrode 210 is formed on the region where the opening 110 is positioned. The first internal electrode 210 is formed on the opening 110. In addition, the first internal electrode 210 is formed on a region where the openings 110 are adjacent to each other. Accordingly, the first internal electrodes 210 are formed to be connected to each other. The opening 110 is formed by an anodic oxidation method to have a diameter of several tens of nanometers, and the first internal electrode 210 may be formed by an atomic layer deposition (ALD). The first internal electrode 210 may be formed of TiN or the like. The first internal electrode 210 may be formed in a thickness of 2.9 nm to 3.1 nm.

Figure 4:
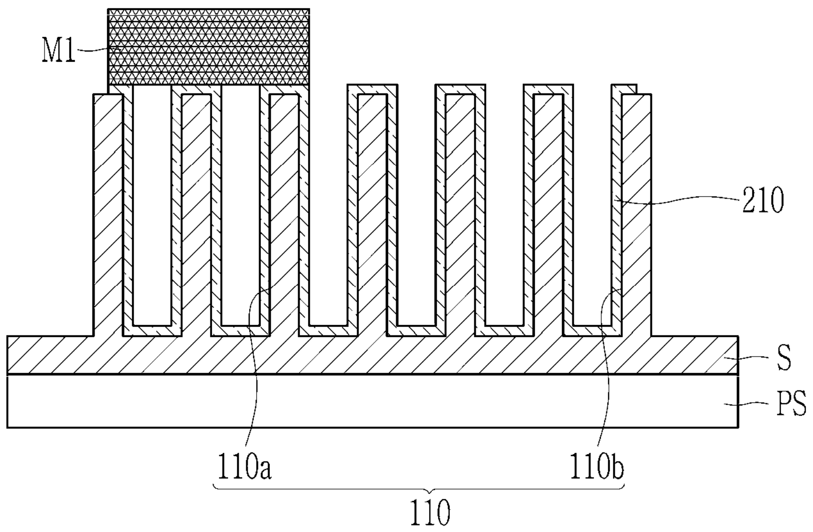

Referring to FIG. 4, in the structure body 100, an anti-deposition mask M1 is formed on the region where the first opening 110*a* is positioned. The anti-deposition mask M1 may be formed through the photoresist PR.

Figure 5:
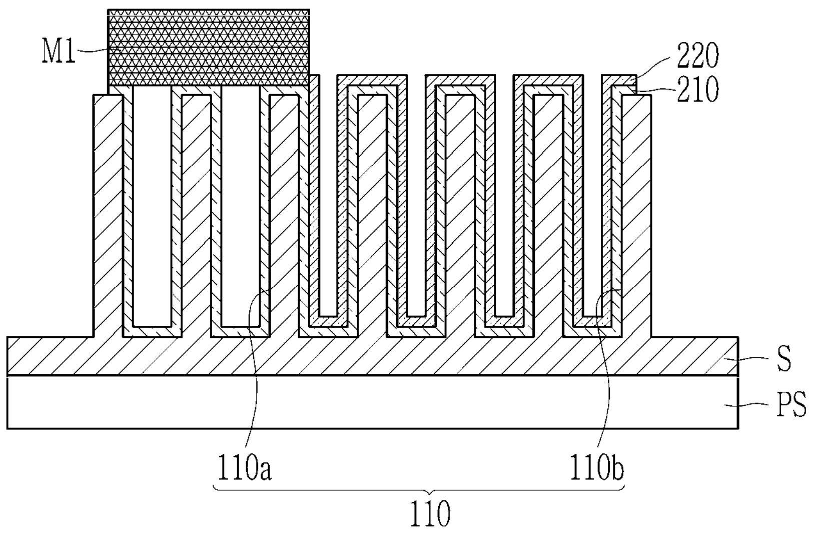

Referring to FIG. 5, in the structure body 100, the dielectric layer 220 is formed on the region where the second opening 110*b* is positioned. That is, the dielectric layer 220 is formed on the first internal electrode 210 of the second opening 110*b*. In addition, the dielectric layer 220 is formed on the first internal electrode 210 of a region where the second openings 110*b* are adjacent to each other. The dielectric layer 220 may be formed by an atomic layer deposition (ALD). The dielectric layer 220 may be formed one of metal oxides such as $Al_2O_3$, $ZrO_2$, and $HfO_2$. In addition, the dielectric layer 220 may be formed as a combination of metal oxides such as $Al_2O_3$, $ZrO_2$, and $HfO_2$. In addition, the dielectric layer 220 may be formed as a ZAZ, which is a $ZrO_2$—$Al_2O_3$—$ZrO_2$ composite layer. At this time, the $ZrO_2$, $Al_2O_3$, $ZrO_2$ layers may have thicknesses of 1.9 nm to 2.1 nm, 0.29 nm to 0.31 nm, 1.9 nm to 2.1 nm, respectively.

On the first internal electrode 210 of the region where the first opening 110*a* is positioned, formation of the dielectric layer 220 is prevented by the anti-deposition mask M1.

Figure 6:
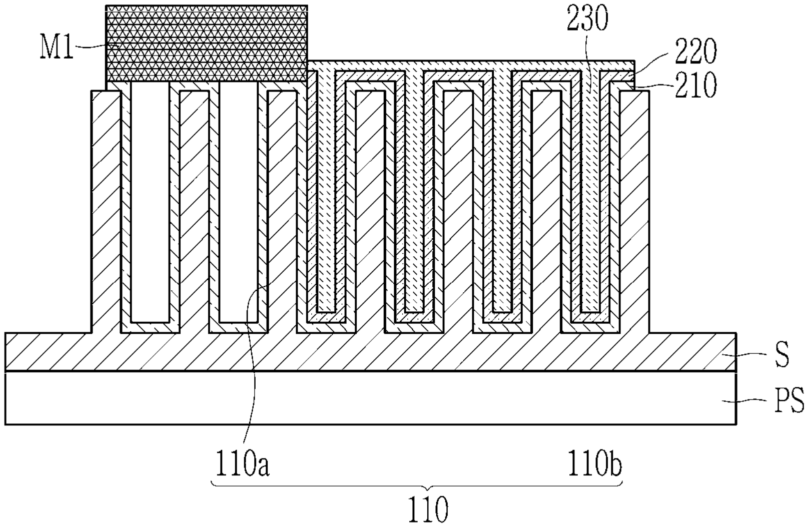

Referring to FIG. 6, in the structure body 100, the second internal electrode 230 is formed on the region where the second opening 110*b* is positioned. That is, the second internal electrode 230 is formed on the dielectric layer 220 of the second opening 110*b*. In addition, the second internal electrode 230 is formed on the dielectric layer 220 of the region where the second openings 110*b* are adjacent to each other. Accordingly, the second internal electrodes 230 are formed to be connected to each other. The second internal electrode 230 may be formed of TiN or the like. The second internal electrode 230 is formed to fill an interior of the second opening 110*b*, and thereby voids may be prevented from generating in the interior of the second opening 110*b*. At this time, the second internal electrode 230 may be formed by an atomic layer deposition (ALD). In addition, as for the second internal electrode 230, after performing the atomic layer deposition, an additional process for filling the interior of the second opening 110*b* may be performed. An additional process for filling the interior of the second opening 110*b* may be performed by using a conductive material, such that the second internal electrode 230 may be formed together with the region on which the atomic layer deposition is performed.

On the first internal electrode 210 of the region where the first opening 110*a* is positioned, formation of the second internal electrode 230 is prevented by the anti-deposition mask M1.

Figure 7:
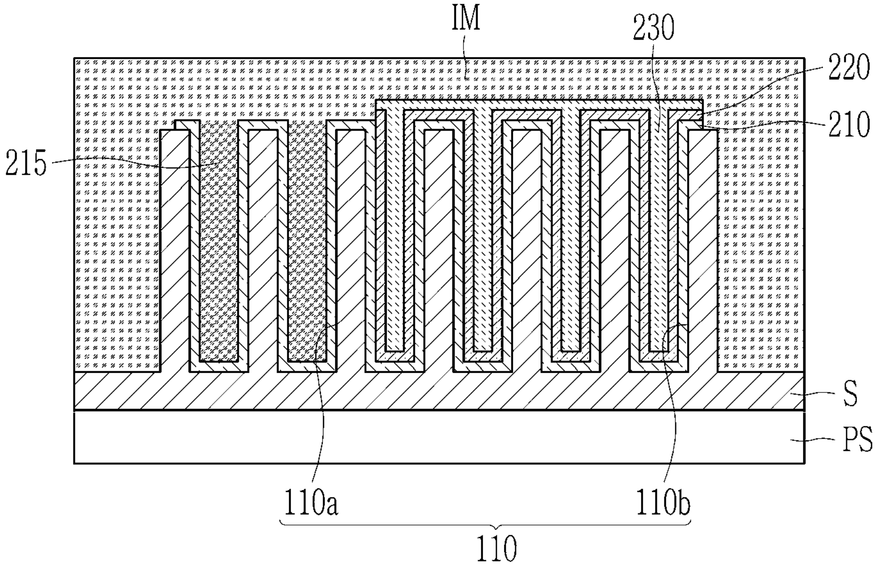

Referring to FIG. 7, after the anti-deposition mask M1 is removed, an insulation material layer IM is formed. A lift-off process, a polishing process, and the like may be used for removal of the anti-deposition mask M1.

The insulation material layer IM is formed to cover the region where the opening 110 is positioned. That is, the insulation material layer IM is formed to cover the first internal electrode 210 on the region where the first opening 110*a* is positioned, such that the first internal electrode 210 is not externally exposed. In addition, the insulation material layer IM is formed to cover the second internal electrode 230 on the region where the second opening 110*b* is positioned, such that the second external electrode 310 is not externally exposed. In addition, an interior of the first opening 110*a* is filled with an insulation material, so as to remove a void in the interior of the first opening 110*a*. Accordingly, the insulation material filled in the interior of the first opening 110*a* may form the filling portion 215. In addition, the insulation material layer IM may be formed to fill a step formed outside the region where the opening 110 is positioned. The insulating material may be polyimide (PI) or the like.

Figure 8:
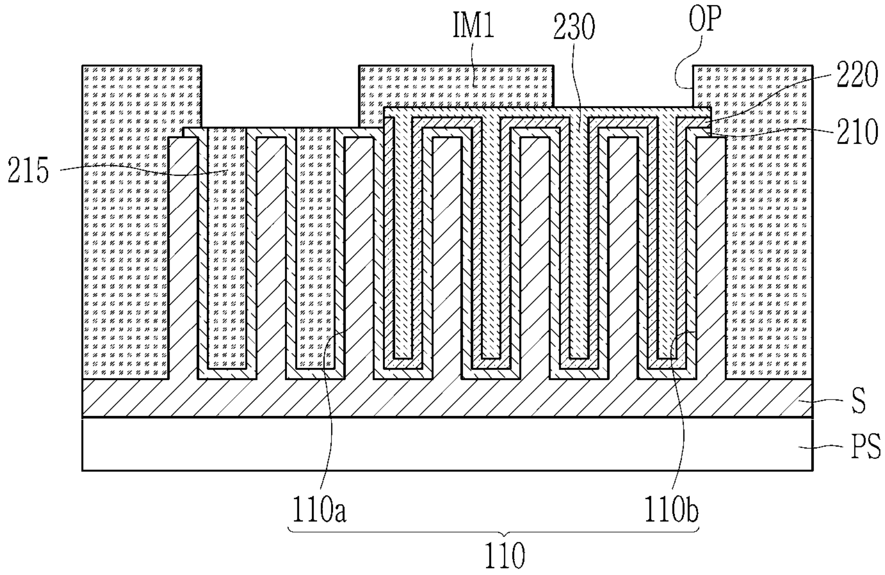

Referring to FIG. 8, an open hole OP is formed in the insulation material layer IM1. The open hole OP is formed in at least a portion of the region where the first opening 110*a* is positioned and the region where the second opening 110*b* is positioned, respectively. Through the open hole OP formed in the region where the first opening 110*a* is positioned, the first internal electrode 210 formed in the region where the first opening 110*a* is positioned is externally exposed. Through the open hole OP formed in the region where the second opening 110*b* is positioned, the second internal electrode 230 formed in the region where the second opening 110*b* is positioned is externally exposed. The open hole OP may be formed by a lithography process.

Figure 9:
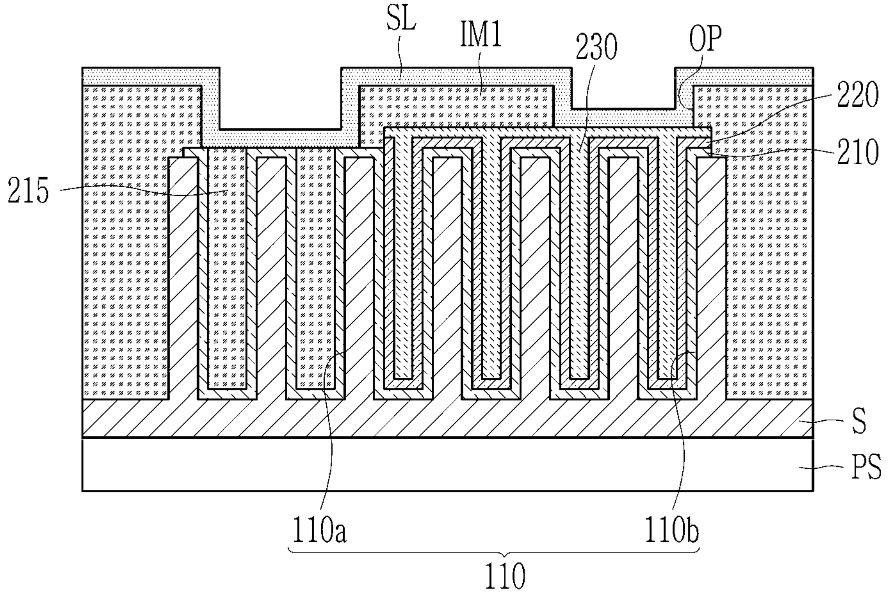

Referring to FIG. 9, a seed layer SL is formed on the open hole OP. The seed layer SL is formed of a metal material such as Ti, Cu, or the like. The seed layer SL may be formed through a sputtering process. The seed layer SL formed on the open hole OP of the region where the first opening 110*a* is positioned may contact the first internal electrode 210. The seed layer SL formed on the open hole OP of the region where the second opening 110*b* is positioned may contact the second internal electrode 230.

Figure 10:
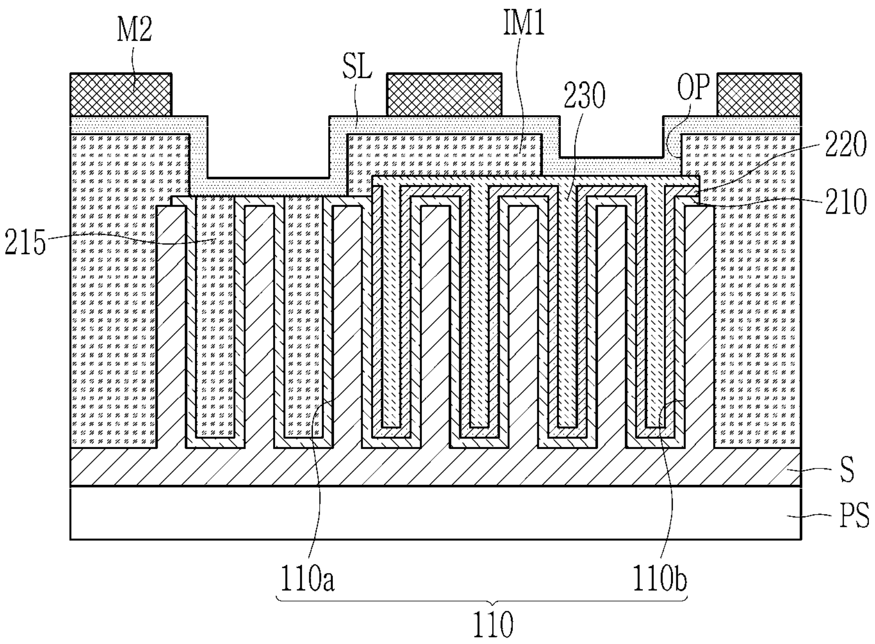

Referring to FIG. 10, an external electrode mask M2 is formed on the insulation material layer IM1. The external electrode mask M2 is formed on an outer periphery of an upper end portion of the open hole OP. A pattern by the external electrode mask M2 is formed such that the seed layer SL formed on the open hole OP may be externally exposed. The external electrode mask M2 may be formed through the photoresist PR.

Figure 11:
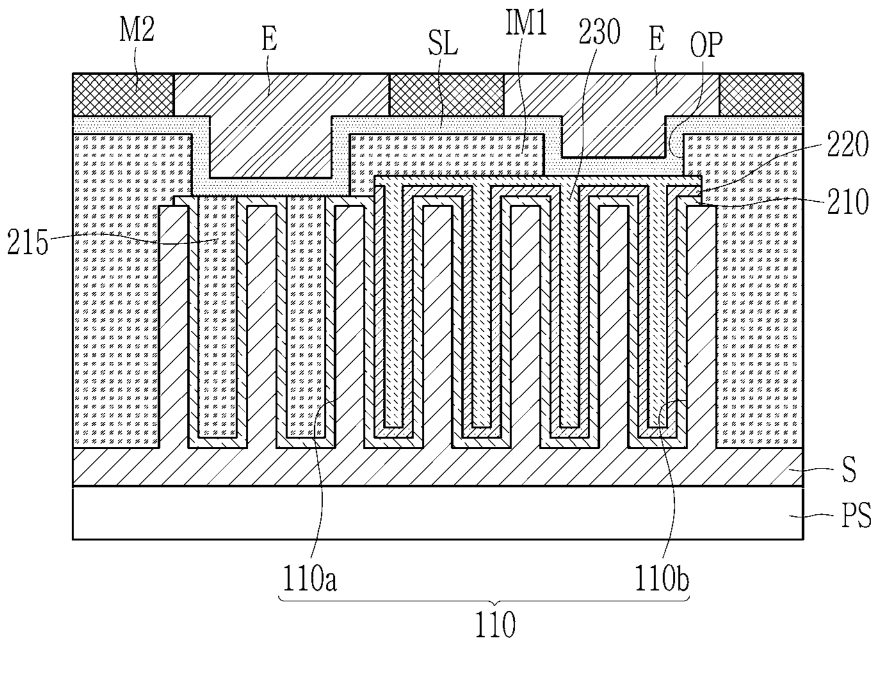

Referring to FIG. 11, an external electrode layer E is formed on the seed layer SL. The external electrode layer E is formed on the seed layer SL formed in the open hole OP by the pattern by the external electrode mask M2. The external electrode layer E may be formed through a plating process using Cu, Sn, Ag, or the like.

Figure 12:
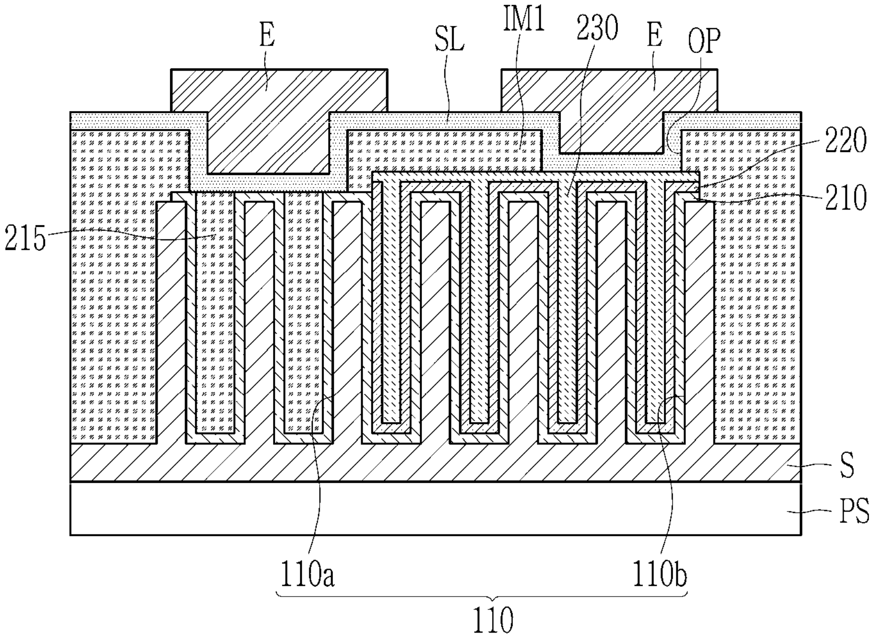

Referring to FIG. 12, the external electrode mask M2 is removed. A lift-off process, an ashing process, or the like may be used for removal of the external electrode mask M2.

Figure 13:
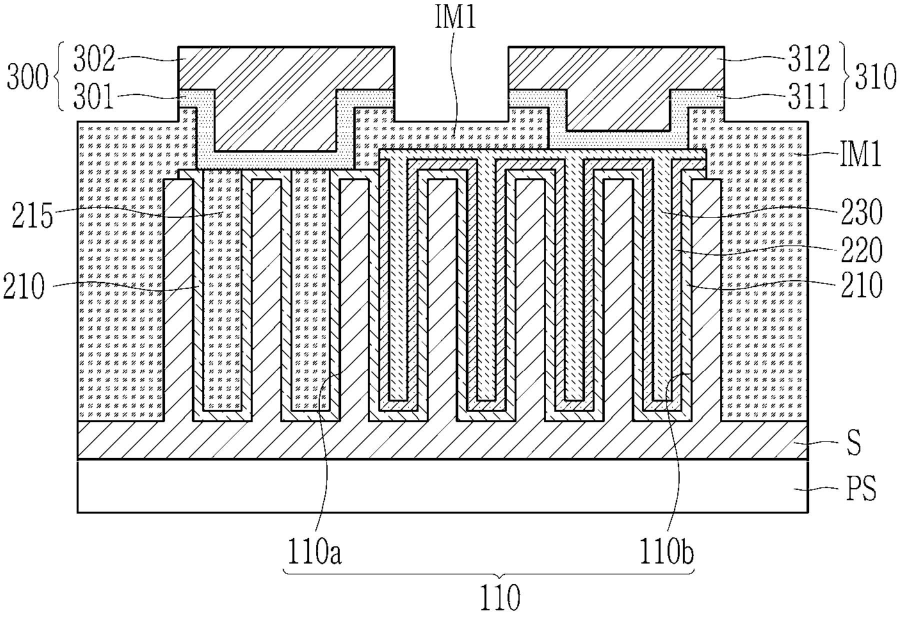

Referring to FIG. 13, the seed layer SL positioned on the insulation material layer IM1 is removed. In the process described above in FIG. 9, the seed layer SL may be formed on the insulation material layer IM1 positioned outside the open hole OP. Accordingly, when the external electrode mask M2 is formed, the seed layer SL may be positioned between the external electrode layer E and the insulation material layer IM1. After the external electrode layer E is formed, the seed layer SL is externally exposed if the external electrode mask M2 is removed. Therefore, by removing the externally exposed seed layer SL, the external electrode layers E are electrically separated from each other. Accordingly, the external electrode layer E becomes the first main electrode portion 302 and a second main electrode portion 312, respectively. In addition, the seed layer SL positioned below the first main electrode portion 302 and the second main electrode portion 312 become the first sub-electrode portion 301 and a second sub-electrode portion 311, respectively.

An etching process or the like may be used for removal of the externally exposed seed layer SL.

Figure 14:
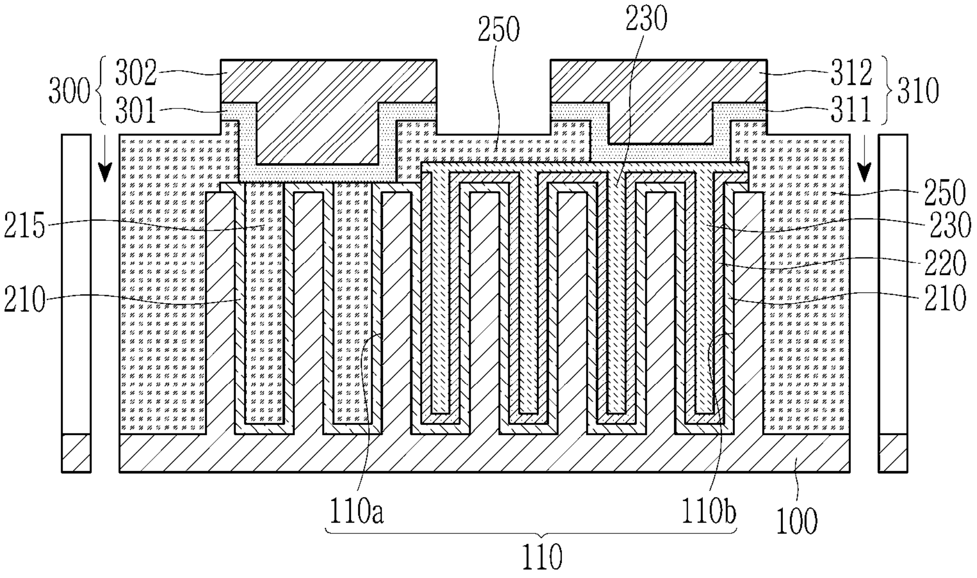

Referring to FIG. 14, a dicing process is performed, to separate each capacitor 10 from each other. Also, prior to the dicing process, the process substrate PS may be separated. In addition, prior to the dicing process, a reflow process to change the shape of the external electrodes 300 and 310 may be performed.

Figure 15:
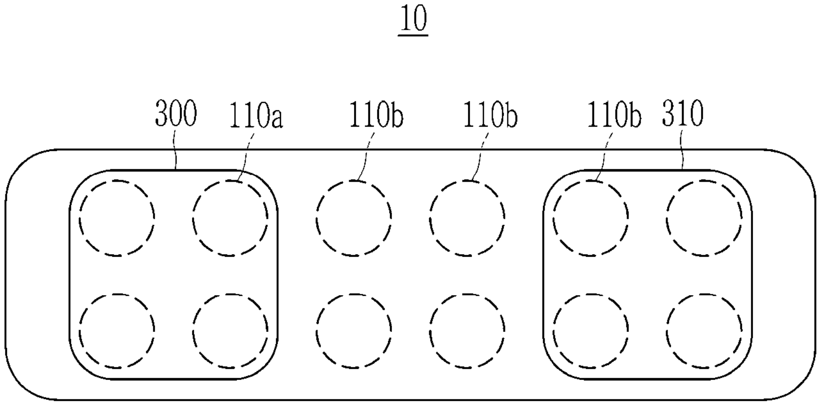
FIG. 15 is a drawing schematically showing a planar shape of a capacitor according to an embodiment.

FIG. 15 is a drawing schematically showing a planar shape of a capacitor according to an embodiment.

Referring to FIG. 15, in the capacitor 10, the first external electrode 300 and the second external electrode 310 may be disposed in a direction facing the first surface 100*a* of the structure body 100. The first external electrode 300 is disposed, in a body, to face the region where the first opening 110*a* is positioned, and connected to the first internal electrode 210. The second external electrode 310 is disposed to face at least a portion of the region where the second opening 110*b* is positioned, and connected to the second internal electrode 230. In addition, the first internal electrodes 210 are entirely connected to each other, and the second internal electrodes 230 are entirely connected to each other.

Most of the first internal electrode 210 and the second internal electrode 230 are disposed on the opening 110. Although only a portion of the openings 110 are shown in FIG. 15 for convenience, a large number of the openings 110 are located in a nanostructure in the structure body 100 made of anodizing aluminum oxide (AAO). Accordingly, based on a plane crossing a direction in which the first surface 100*a* and the second surface 100*b* of the structure body 100 face each other, a surface area of the first internal electrode 210 and the second internal electrode 230 is significantly larger than area occupied by the structure body 100. As a result, the capacitor 10 may have a very large capacity compared to its size.

Figure 16:
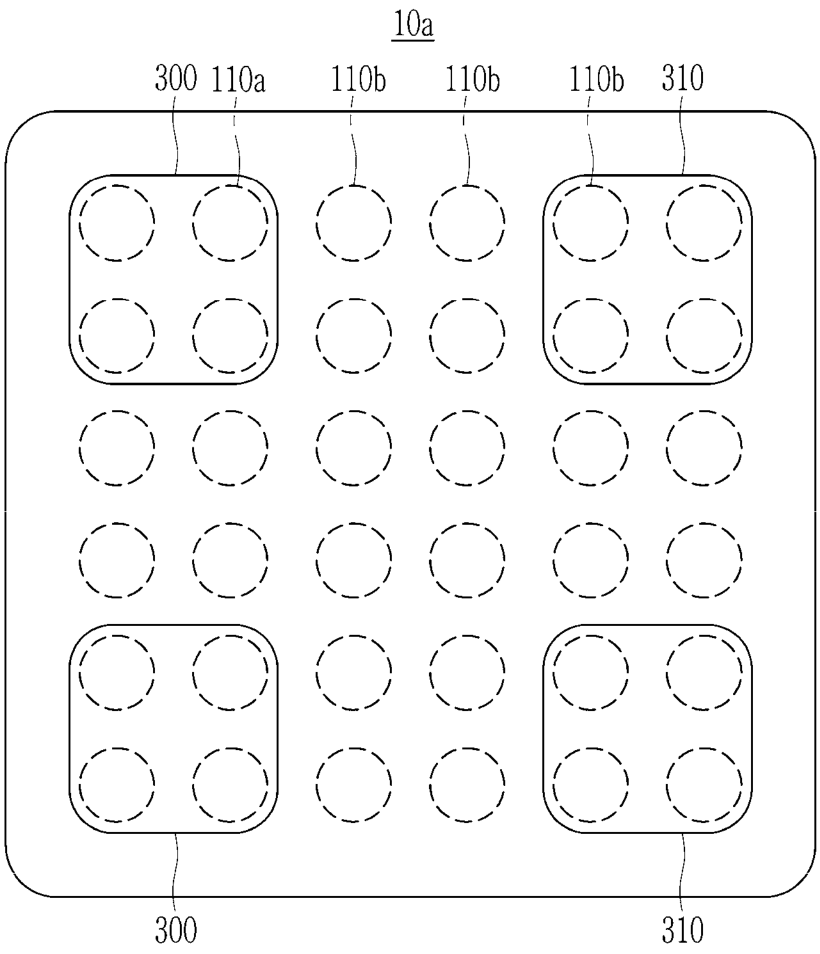
FIG. 16 is a drawing schematically showing a planar shape of a capacitor according to another embodiment.

FIG. 16 is a drawing schematically showing a planar shape of a capacitor according to another embodiment.

Referring to FIG. 16, in a capacitor 10*a*, the first external electrode 300 and the second external electrode 310 may be disposed in the direction facing the first surface 100*a* of the structure body 100.

Based on a plane crossing a direction in which the first surface 100*a* and the second surface 100*b* of the structure body 100 face each other, when the opening 110 is positioned, an area occupied by the first external electrode 300 and the second external electrode 310 may be small in comparison to an area. Accordingly, the capacitor 10*a* may include a plurality of first external electrodes 300. In addition, the capacitor 10*a* may include a plurality of second external electrodes 310.

The structure body 100 may include a plurality of regions where the first opening 110*a* is positioned. In the structure body 100, each of the first external electrodes 300 is disposed to face the region where the first opening 110*a* is positioned, and connected to the first internal electrode 210. In addition, in the structure body 100, each of the second external electrodes 310 is disposed to face a portion of the region where the second opening 110*b* is positioned, and connected to the second internal electrode 230. The first internal electrodes 210 disposed across the plurality of openings 110 are connected to each other. Accordingly, in the structure body 100, a position of the first opening 110*a* where the dielectric layer 220 and the second internal electrode 230 are not formed, and a position and quantity of the first external electrodes 300 may be adjusted. In addition, the second opening 110*b* is positioned except for the region where the first opening 110*a* is positioned. Accordingly, the second internal electrodes 230 disposed across a plurality of second openings 110*b* are connected to each other. Accordingly, by selecting the region where the second external electrode 310 is disposed from the region where the second opening 110*b* is positioned, the position and quantity of the second external electrode 310 included in the capacitor 10*a* may be adjusted.

While the present disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A capacitor, comprising:

a structure body comprising a first surface and a second surface opposing each other in a vertical direction, wherein a plurality of openings are recessed from the first surface;

a first internal electrode disposed on a region where the plurality of openings are positioned;

a dielectric layer disposed on a partial region of the first internal electrode and spaced apart from a first opening of the plurality of openings;

a second internal electrode disposed on the dielectric layer and spaced apart from the first opening;

a first external electrode disposed on the first surface to cover the first opening or an upper surface of a wall of the first opening, and connected to the first internal electrode; and a second external electrode disposed on the first surface, and connected to the second internal electrode, wherein the first internal electrode extends along a side surface and the upper surface of the wall of the first opening.

2. The capacitor of claim 1, wherein the structure body includes anodizing aluminum oxide.

3. The capacitor of claim 1, wherein:

the first external electrode faces a region where the first opening is disposed in the vertical direction.

4. The capacitor of claim 1, wherein:

the first external electrode is connected to a portion of the first internal electrode disposed on the upper surface of the wall of the first opening.

5. The capacitor of claim 4, wherein the first external electrode is in contact with the portion of the first internal electrode disposed on the upper surface of the wall of the first opening.

6. The capacitor of claim 5, wherein the first external electrode comprises:

a first sub-electrode portion contacting the portion of the first internal electrode disposed on the upper surface of the wall of the first opening; and a first main electrode portion positioned on the first sub-electrode portion.

7. The capacitor of claim 1, wherein:

the second external electrode faces a region where a second opening of the plurality of openings is disposed in the vertical direction.

8. The capacitor of claim 1, wherein:

the second external electrode is connected to a portion of the second internal electrode disposed on an upper surface of a wall of a second opening of the plurality of openings.

9. The capacitor of claim 8, wherein the second external electrode is in contact with the portion of the second internal electrode disposed on the upper surface of the wall of the second opening.

10. The capacitor of claim 9, wherein the second external electrode comprises:

a second sub-electrode portion contacting the portion of the second internal electrode disposed on the upper surface of the wall of the second opening; and a second main electrode portion positioned on the second sub-electrode portion.

11. The capacitor of claim 1, wherein the first external electrode and the second external electrode are provided in a plural quantity, respectively.

12. The capacitor of claim 1, wherein the dielectric layer includes one of $Al_2O_3$, $ZrO_2$, and $HfO_2$ or a combination thereof, or ZAZ which is a $ZrO_2$—$Al_2O_3$—$ZrO_2$ composite layer.

13. A capacitor, comprising:

a structure body of anodizing aluminum oxide, comprising first surface and a second surface positioned in opposite directions, wherein a plurality of openings are positioned on the first surface;

a first internal electrode disposed on the first surface in a region between the plurality of openings, and on the plurality of openings;

a dielectric layer disposed on a partial region of the first internal electrode;

a second internal electrode disposed on the dielectric layer;

a first external electrode connected to the first internal electrode, and disposed in a direction to which the first surface of the structure body faces; and a second external electrode connected to the second internal electrode, and disposed in the direction to which the first surface of the structure body faces, wherein the plurality of openings comprises first openings and a second opening, the dielectric layer and the second internal electrode do not exist in a region where the first openings are adjacent to each other, and the first external electrode is connected to the first internal electrode of a region positioned adjacent to the first openings.

14. The capacitor of claim 13, further comprising a filling portion disposed on the first internal electrode disposed in the first openings.

* * * * *